United States Patent [19]
Cook

[11] Patent Number: 5,260,767
[45] Date of Patent: Nov. 9, 1993

[54] COMPACT ALL-REFLECTIVE IMAGING SPECTROMETER

[75] Inventor: Lacy G. Cook, El Segundo, Calif.

[73] Assignee: Hughes Aircraft Company, Los Angeles, Calif.

[21] Appl. No.: 808,148

[22] Filed: Dec. 16, 1991

[51] Int. Cl.$^5$ ............................ G01J 3/28; G01J 3/36
[52] U.S. Cl. ..................... 356/326; 356/334; 356/328
[58] Field of Search ............... 356/326, 328, 334, 419; 359/366

[56] References Cited

U.S. PATENT DOCUMENTS 4,265,510  5/1981  Cook ................................ 359/366
4,632,521 12/1986  Korsch .............................. 359/366
4,773,756  9/1988  Blechinger ........................ 356/334
4,957,371  9/1990  Pellicori et al. .................. 356/419

*Primary Examiner*—Vincent P. McGraw
*Assistant Examiner*—K. P. Hantis
*Attorney, Agent, or Firm*—Michael W. Sales; Wanda K. Denson-Low

[57] ABSTRACT

An all-reflective imaging spectrometer (10) has a three-mirror anastigmat (12) acting as its objective and a reflective triplet (14) with a dispersive element (18) providing the spectrometer collimator and imager. The system is capable of imaging an object being viewed to provide a plurality of different wavelength images of that object.

7 Claims, 2 Drawing Sheets

COMPACT ALL-REFLECTIVE IMAGING SPECTROMETER

BACKGROUND OF THE INVENTION

1. Technical Field

This invention relates to imaging spectrometers and, more particularly, to an all-reflective imaging spectrometer with an all-reflective objective module and an all-reflective spectral module.

2. Discussion

For certain strategic, scientific and resource sensing applications, there is a need for optical systems capable of forming high resolution pictures in a large number of different wavelength bands. Imaging spectrometers are instruments capable of providing these functions. Typically, an imaging spectrometer is composed of an objective or imaging optical module, which forms a scene image at a slit, and a spectral optical module, which receives and collimates the line field of view from the objective, disperses or separates the radiation as a function of wavelength, and images it onto a two dimensional detector array. One dimension of the array contains spatial information, while the other contains spectral information. The entire instrument is then scanned in a direction normal to the slit to cover a large spatial scene.

Current existing spectrometers include an objective optical module and a spectral optical module. Also, it is known to utilize a double pass technique in the spectral optics. Generally, these spectrometers have utilized all-refractive or refractive and reflective components. These refractive systems have several disadvantages. Some limitations of refractive systems are chromatic aberration, spectral limitations, defocus with temperature change requiring compensation, potential high narcissus, and high cost associated with the complexity and expensive refractive materials.

SUMMARY OF THE INVENTION

According to the teachings of the present invention, a system is provided which retains the versatility and benefits of reflective optics, while eliminating the disadvantages of refractive optical systems. The present invention provides an all-reflective imaging spectrometer. The spectrometer utilizes all-reflective components, which provides a compact unit.

The present invention combines two compact, all-reflective optical modules into an imaging spectrometer which has a very small size and maintains excellent spatial and spectral performance. The spectrometer may be easily manufactured and is relatively inexpensive. The invention is compatible with numerous dispersive elements to provide moderate spectral resolution over a broad wavelength band or to provide high spectral resolution over a more narrow band. The present invention utilizes the spectral module in a double pass technique which utilizes the same system to both collimate and image the radiation beam. This collimating and imaging function by the same system further enables reduction of the size of the system. Also, the all-reflective nature of the optical system enables general applications from visible wavelength out to the extended LWIR. In addition, the spectrometer may be utilized with a wide field of view.

In the preferred embodiment, the all-reflective imaging spectrometer includes a first and second optical module. The first module is an image forming three-mirror anastigmat which serves as the objective of the system. The second module is a real entrance pupil reflective triplet which is used in double pass as the spectral collimator and imager. Also, a dispersive mechanism is provided to separate and return the radiation through the triplet. The radiation is focused on a viewing plane with a plurality of different wavelength images of the viewed object.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
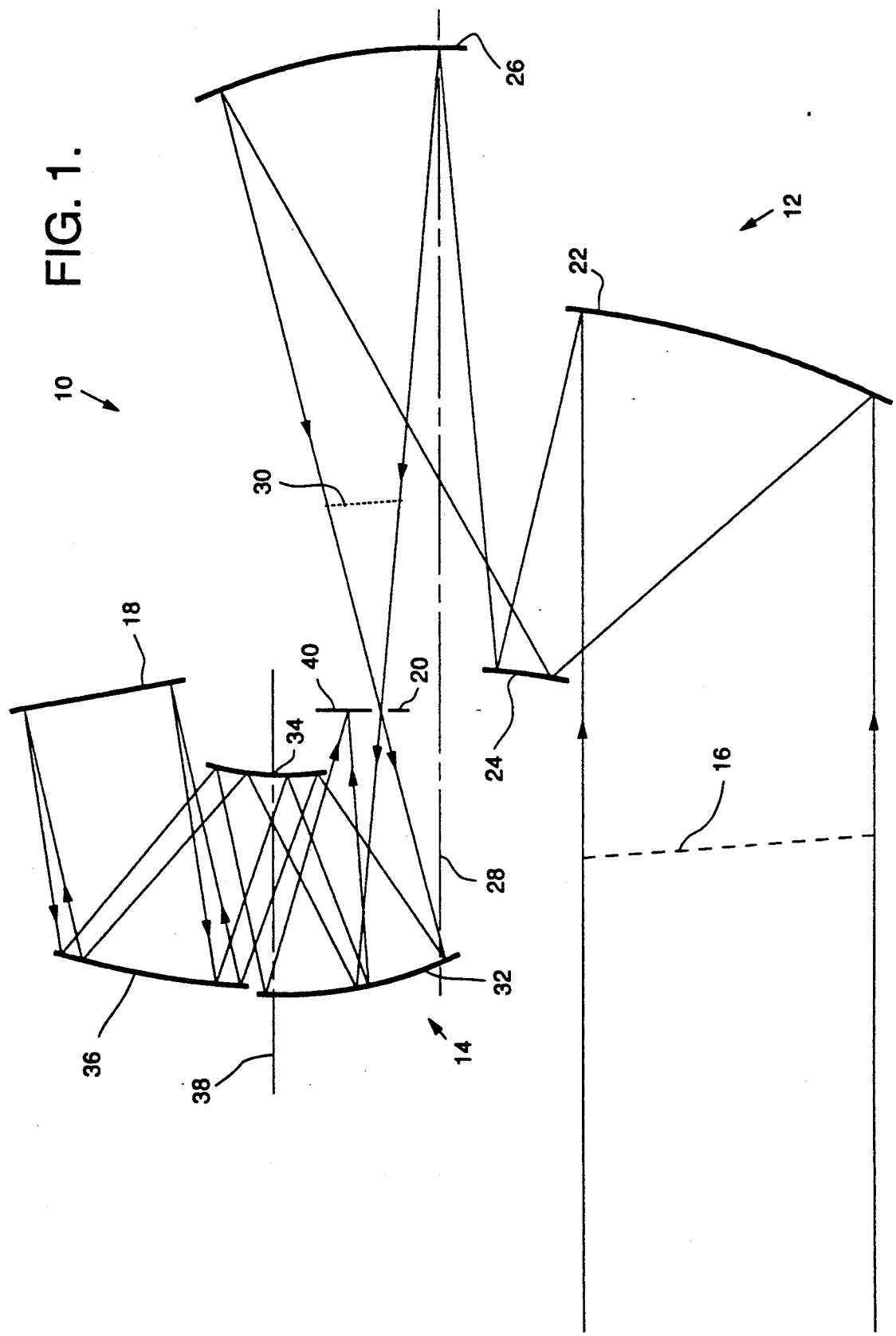
FIG. 1 is a spectral dimension view of a imaging spectrometer in accordance with the present invention.
Figure 2:
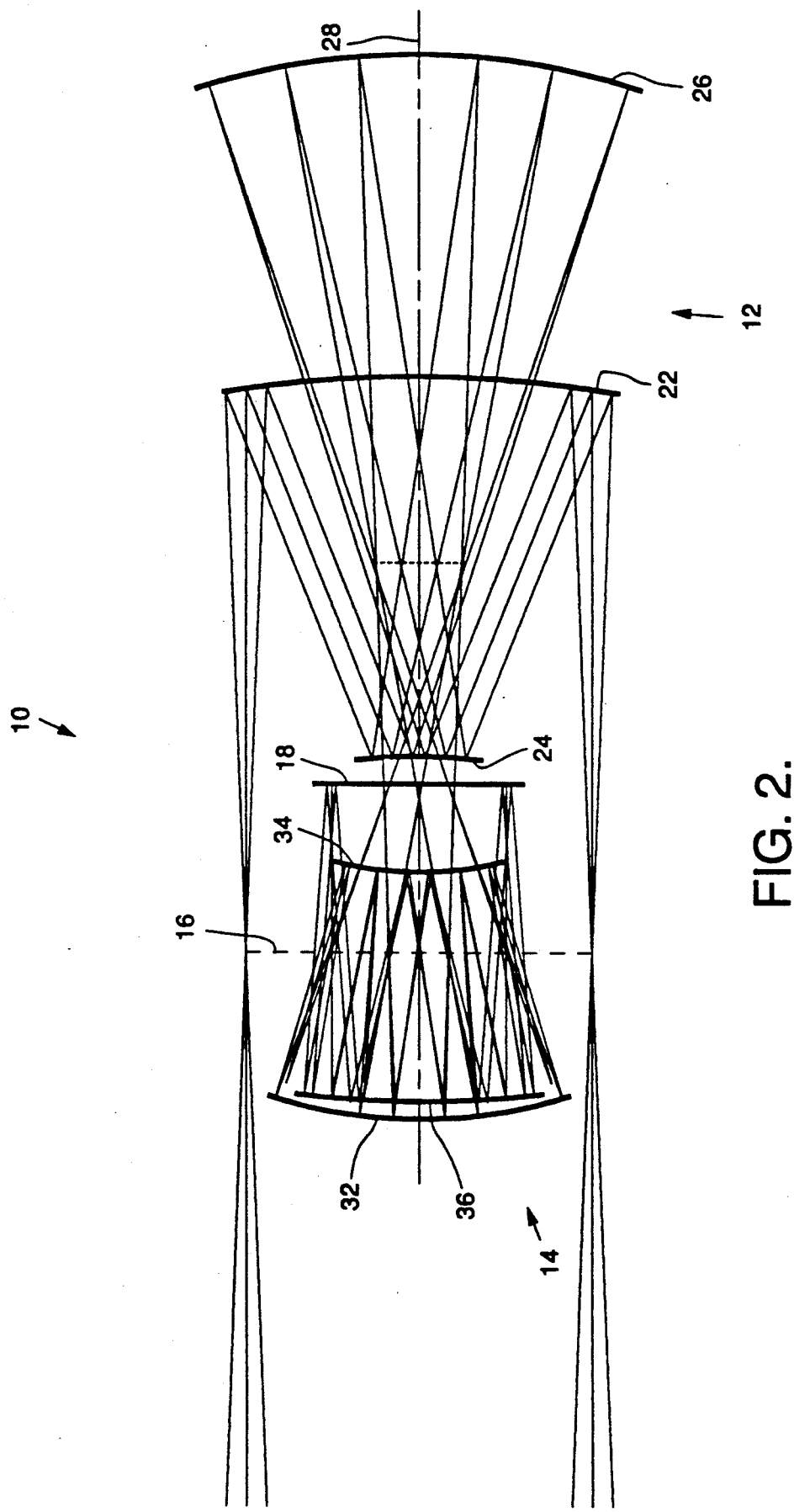
FIG. 2 is a spatial dimensional view of the optical system of FIG. 1.

Referring to FIGS. 1 and 2, an imaging spectrometer is illustrated and designated with the reference numeral 10. The all-reflective spectrometer includes a first optical module 12 which serves as the spectrometer objective and a second optical module 14 which serves as the spectrometer collimator and imager. A real entrance pupil 16 is positioned in front of the spectrometer objective 12. A pupil 30, which is an image of the entrance pupil 16 formed by the mirrors of the objective module 12, serves as the exit pupil of the objective module 12 and as the entrance pupil to the spectral module 14. A slit 20 admits a line portion of the scene imaged by objective module 12 into the spectral module 14. A dispersive element 18 receives radiation from the spectral collimator on the first pass through the spectral module 14, angularly disperses the radiation according to wavelength, and reflects the spectrum back through the optical module to be imaged onto detector array 40. It should be noted that dispersive element 18 is also located at a pupil which is an image of pupil 30 as formed by the mirrors in the spectral module 14. This arrangement minimizes the size of the dispersive element 18 and generally provides for a smaller size unit.

The first optical module 12 is a three-mirror anastigmat. The three-mirror anastigmat includes a primary mirror 22, a secondary mirror 24 and a tertiary mirror 26.

The primary mirror 22 includes a central axis which defines the objective module optical axis 28. The primary mirror 22 is a negative or positive power mirror and may be a conic or higher order aspheric mirror.

The secondary mirror 24 is a positive or negative power mirror and is positioned in a cassegrain-like configuration or in a reverse cassegrain-like configuration with respect to the primary mirror 22. The secondary mirror 24 may be a conic or higher order aspheric mirror.

The tertiary mirror 26 is generally a positive power mirror. The tertiary mirror 26 may be a conic or higher order aspheric mirror.

The primary, secondary and tertiary mirrors act as the objective part of the imaging spectrometer. The primary, secondary and tertiary mirrors project an image of the object being viewed to a plane, which is were the slit 20 is located. Generally, a mirror configuration is utilized which reflects radiation from the object being viewed to the primary and secondary mirror which form an intermediate image prior to reflecting the radiation to the tertiary mirror. The tertiary mirror reimages the radiation and ultimately reflects it through an exit pupil to an imaging plane at which would be positioned the slit 20.

Three-mirror anastigmat optics suitable for the objective module of the present invention are illustrated in U.S. Pat. No. 4,101,195 to Korsch and Applicant's prior U.S. Pat. Nos. 4,265,510 and 4,834,517, and U.S. application Ser. No. 07/745,674, now U.S. Pat. No. 5,170,284 entitled "Wide Field Of View Focal Three Mirror Anastigmat", filed Aug. 16, 1991, to Cook, all assigned to the Assignee of the present invention, and all of the above references, the specifications and drawings of which are herein expressly incorporated by reference.

The spectral collimator and imager 14 is a three-mirror reflective triplet including primary mirror 32, secondary mirror 34, tertiary mirror 36. The primary mirror 32 defines an optical axis 38 for the spectral module. The primary mirror 32 is an off-axis positive power mirror and may be a conic or higher order aspheric mirror.

The secondary mirror 34 is a negative power mirror and is positioned substantially on-axis. The secondary mirror 34 is positioned to receive radiation from the primary mirror 32 and may be a conic or higher order aspheric mirror.

The tertiary mirror 36 is a positive power mirror. The tertiary mirror 36 is positioned substantially off-axis with respect to the optical axis 38 of the module. The tertiary mirror 36 may be a conic or higher order aspheric mirror.

The dispersive element 18 may be a reflection grating or a prism located at the exit pupil of the reflective triplet. In the case of a reflective grating, the grating lines are in and out of the plane of FIG. 1, and the radiation is returned back through the reflective triplet with the spectrum angularly spread in the plane of the figure. The three mirrors of the reflective triplet refocus the radiation back down onto the image surface 40, essentially forming images of the slit 20 separated according to color. The images are formed on one side or the other of the actual slit 20, depending on the tilt of the grating. Generally, a plurality of images are formed at different wavelengths.

In the case of a prism, the rear prism surface is coated to reflect the radiation, and the radiation thus makes a double pass through the prism. The radiation is angularly dispersed in the plane of FIG. 1 because of the prism material dispersion and the prism wedge angle (axis of rotation forming the prism wedge is in and out of the plane of FIG. 1). Radiation is returned to the reflective triplet and refocused as spectral images on one side or the other of the actual slit 20 depending on the prism tilt. Thus, the triplet is off-axis, non-relayed, with a real and accessible pupil 18 positioned external to the optical system.

A reflective triplet with a real pupil which may be utilized in the present invention is illustrated in Applicant's U.S. Pat. No. 4,733,955, assigned to the Assignee of the present invention, the specification of which is herein expressly incorporated by reference.

It is desirable to match the real exit pupil of the three-mirror anastigmat to the virtual entrance pupil of the reflective triplet. Due to the position of the entrance pupil 16 and the relayed nature of the three-mirror anastigmat objective module, a real pupil 30 is formed in the optical system between the tertiary mirror 26 and the focal plane 20. When the three-mirror anastigmat and the reflective triplet are placed image to image, the non-relayed nature of the reflective triplet reimages this real pupil in the three-mirror anastigmat to a real location after the reflective triplet. Thus, the dispersive element 18 is positioned at the exit pupil formed by the reflective triplet.

The present invention has several advantages over other spectrometers. The present invention provides a compact size, broad spectral coverage, low cost, wide field of view, and high spatial and spectral resolution. The present invention could find application in scientific observation, resource sensing and strategic surveillance activity. The invention is capable of gathering high spectral resolution data to aid in the design of future operational systems.

Also, a sensing device or focal plane detector array may be positioned at the image 40 to sense the radiation as it exits from the primary mirror of the reflective triplet. Thus, a sensor may be utilized to interpret the information received by the spectrometer 10.

It should be understood that the present invention is susceptible to various modifications, alterations and variations of the disclosed preferred embodiment after having the benefit of the study of the specifications, drawings, and subjoined claims.

What is claimed is:

1. An imaging spectrometer comprising:
    an all-reflective objective means including a primary mirror defining an optical axis, a secondary mirror facing said primary mirror such that radiation from a viewed object is reflected by said secondary mirror, and an objective tertiary mirror positioned to receive radiation from said secondary mirror and to reflect said radiation;
    an all-reflective means for collimating and imaging said radiation received from said all-reflective objective means, said collimating and imaging means including a reflective triplet with a primary mirror for reflecting radiation received from said objective tertiary mirror, a secondary mirror reflecting radiation received from said primary mirror and a tertiary mirror reflecting radiation received from said secondary mirror; and
    dispersive means for receiving and reflecting said radiation from said reflective triplet tertiary mirror such that said radiation is collimated as it passes from said reflecting triplet tertiary mirror to said dispersive means which, in turn, reflects said radiation back through said reflective triplet wherein said radiation is focused on a viewing plane as a plurality of different wavelength images of the viewed object.

2. The imaging spectrometer according to claim 1 wherein said collimating and imaging means includes an entrance slit positioned at a viewing plane to enable admission of said radiation from said objective tertiary mirror.

3. The imaging spectrometer according to claim 2 wherein an entrance pupil is positioned such that a real exit pupil of said all-reflective objective means is at the virtual entrance pupil of said reflective triplet.

4. The imaging spectrometer according to claim 1 wherein all said primary, secondary and tertiary mirrors are powered mirrors.

5. The imaging spectrometer according to claim 1 wherein said all-reflective objective means is a wide field of view three-mirror anastigmat.

6. The imaging spectrometer according to claim 1 wherein said dispersive means is comprised of a reflection grating.

7. The imaging spectrometer according to claim 1 wherein said dispersive means is comprised of a prism.

* * * * *